United States Patent [19]
Dransfield

[11] 3,818,440
[45] June 18, 1974

[54] SEISMIC ENERGY GENERATOR FLOAT
[75] Inventor: Clifford D. Dransfield, Dallas, Tex.
[73] Assignee: Atlantic Richfield Company, Los Angeles, Calif.
[22] Filed: Dec. 8, 1972
[21] Appl. No.: 313,547

[52] U.S. Cl............. 340/8 S, 114/235 B, 340/3 T, 340/17 R
[51] Int. Cl..................... H04b 13/02, B63b 21/56
[58] Field of Search.................. 340/8 S, 7, 17, 3 T; 181/.5 XC, .5 NC, .5 VM; 114/235 R, 235 B, .5 F, 66.5 F; 9/8 R, 8 D

[56] References Cited
UNITED STATES PATENTS

| 3,078,202 | 2/1963 | Bellanca et al. | 116/66.5 F |
| 3,137,264 | 6/1964 | Brainard et al. | 340/3 T |
| 3,235,027 | 2/1966 | Kilmer | 181/.5 NC |
| 3,310,019 | 3/1967 | Standridge | 114/235 R |
| 3,331,050 | 7/1967 | Kilmer et al. | 340/17 X |
| 3,366,982 | 2/1968 | Sutton | 9/8 P |
| 3,729,755 | 5/1973 | Cochrane | 9/8 R |

Primary Examiner—Benjamin A. Borchelt
Assistant Examiner—H. J. Tudor

[57] ABSTRACT

A float for carrying a seismic energy generator includes two side-by-side float assemblies, each of two enclosed tubes tapered at their front ends to facilitate towing, and wrapped lengthwise with a fiberglass sheet. The edges of the sheet and exposed surfaces are filled and coated with a tough coat to present a smooth surface. The two float assemblies are interconnected with braces, which support a deck and a mounting platform from which the seismic energy generator is suspended.

11 Claims, 2 Drawing Figures

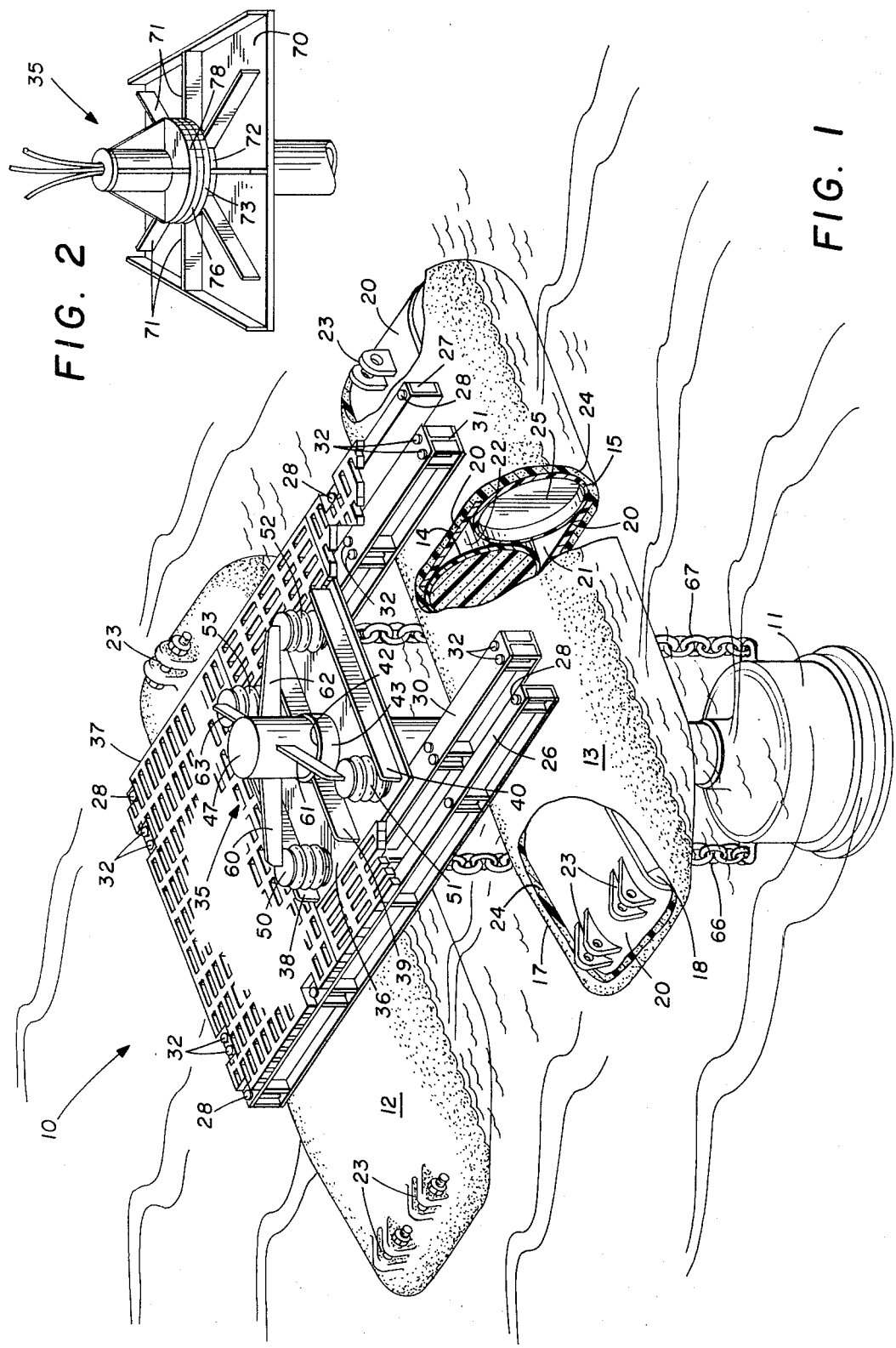

SEISMIC ENERGY GENERATOR FLOAT

BACKGROUND OF THE INVENTION

1. Field of the invention

This invention relates to improvements in seismic exploration equipment, and more particularly to improvements in apparatus for carrying a seismic energy generator, or the like.

2. Description of the prior art

In conducting offshore seismic exploration, generating seismic energy waves presents numerous problems, one of which is the carrying and positioning of the seismic energy source or generator. Especially in shallow water regions, maneuverability may be restricted, but speed in performing the survey is nevertheless desired.

Recently, expansible combustion chamber generators of the type having a combustion chamber within which a gas explosion occurs to retroact a large plate or mass against a recoiling piston have been receiving increased interest for both land and marine use. Seismic surveys using such generators have been done by suspending the generator from a crane, boom, or the like off the side of a boat, firing it, raising it, moving the boat to the next location, and repeating the process until the survey is completed. It has also been proposed to attach such generator by such as the piston, to a raft or the like and tow it from place to place, stopping to fire it at desired locations. However, in such arrangements, the up and down shock waves generated are transmitted by the piston to the raft, and after a relatively few firings, the raft can be literally shaken to pieces.

Additionally, surveys are frequently performed in areas having extreme environments in which the seismic apparatuses and equipment may be exposed to very cold or very hot temperatures, rain, naturally occurring ultraviolet light, and the like, and many of the rafts previously proposed are not of substantial stamina to withstand such extremes.

One apparatus previously proposed is set forth in U.S. Pat. No. 3,331,050, a paravane which can be towed by a submarine or other boat at various underwater depths. The paravane carries a seismic energy generator and muffler, and includes two side-by-side floats and various independent steering and controlling devices.

Another problem in a generator-carrying raft is that the large upward forces of the generator may lift the raft completely out of the water. The reimpact onto the surface could generate spurious, undesirable noise in the subsequent recording process degrading the quality of the survey. Thus, a carrying raft should in design have sufficient surface contact with the water to create a surface tension considerably larger than the upward force of the generator.

SUMMARY OF THE INVENTION

In light of the above, it is, therefore, an object of the invention to provide a means for constraining a seismic energy generator upon or at a predetermined depth beneath a surface of water.

It is another object of the invention to provide an apparatus for carrying a seismic energy generator on or at a predetermined depth beneath water and from which the seismic energy generator may be fired or operated.

It is another object of the invention to provide apparatus for carrying a seismic energy generator, which may be towed on the water from place to place.

It is yet another object of the invention to present a durable and lightweight apparatus for carrying a seismic energy generator which can withstand environmental extremes and shocks experienced from the generator.

It is another object of the invention to provide apparatus presenting sufficient surface contact to maintain its position after firing without generating interfering seismic noise.

It is another object of the invention to present a marine seismic energy generator carrying apparatus which can be easily dismantled for transporting from one location to another, or into remote locations.

These and other objects, features, and advantages will become apparent to those skilled in the art from the detailed description hereinafter set forth when read in conjunction with the appended claims and accompanying drawing.

The apparatus, in accordance with the invention, in its broad aspect, includes a pair of floats side by side interconnected by forward and aft braces. A platform with a centrally located hole therethrough is carried upon the braces, and means are supplied for suspending the seismic energy generator below the floats beneath the fluid surface. A hollow tube portion extends through the hole in the platform through which the fuel, control, and exhaust lines to the seismic energy generator are conducted.

Each of the floats includes two adjacent tubes tapered at their front ends to facilitate towing. The tubes are filled with buoyant material, wrapped lengthwise with a sheet, and coated with a protective material to present an overall smooth surface.

BRIEF DESCRIPTION OF THE DRAWING

The invention is illustrated in the accompanying drawing, wherein

FIG. 1 is a perspective view, partially cut away, of the float in accordance with the invention, And FIG. 2 is a perspective view of an alternative embodiment of a mounting deck for use in conjunction with the float of FIG. 1.

Various sizes, shapes, and dimensions of the apparatus illustrated have been distorted or exaggerated for clarity of illustration and ease of description.

DETAILED DESCRIPTION OF THE PREFERRED EMBODIMENTS

The float 10 for constraining or carrying a seismic generator 11 shown in FIG. 1, includes two side-by-side essentially identical float assemblies 12 and 13. As shown by the partially cutaway portion of float 13, each float assembly includes two adjacent tubes 14 and 15, of strong material, such as stainless steel, aluminum, fiberglass, or the like. Filament wound fiberglass or the like filled with a buoyant material such as polyurethane foam has been found to be a particularly suitable material because of its light weight and strength. To facilitate towing, the fronts 17 of the tubes 14 and 15 taper inwardly from the sides and upwardly from the bottom to resemble a keel, as shown.

Plates, such as plate 18 illustrated, close the front and back ends of the tubes 14 and 15, and a fiberglass sheet 20 surrounds the length of the two tubes, providing an essentially flat surface on their tops and bottoms, and defining air spaces 21 and 22 beneath the sheet 20 and between the tubes. A coat 24 of thermal-setting vinylester resin, or the like, fills the edges of the sheet 20 and coats the entire assembly to achieve a smooth exterior to prevent ultraviolet light to which the float may be exposed from making the fiberglass brittle, and to prevent it from becoming fouled with slime and barnacles. The resin is desirably of a type in which after application results in a singular molecular chain to present thermal and physical shock resistance.

One or more eyes 23 are provided forwardly and aft, through which bolts or the like (see float 12) may be passed to which a rope or the like (not shown) may be attached for pulling or towing the apparatus 10. The eyes 23 can conveniently be attached to the sheet 20 before the coat 24 is applied.

Bulkheads such as bulkhead 25, as shown in the cutaway portion of tube 15, placed at various intermediate locations within the tubes 14 and 15, provide support, and maintain the rigidity of the walls of the tubes.

The bulkheads can be solid, as shown, or can have one or more openings to facilitate communication between adjacent compartments to enable foam or other material to be disposed therewithin, if desired, as below described.

Cross-braces 26 and 27, which can be channel or "U-shaped" steel, iron, or the like, as illustrated, bolted into place by bolts 28, connect the two float assemblies 12 and 13 together. Additionally, "I" beam members 30 and 31 of steel, iron, or the like, bolted by bolts 32 to the float assemblies, similarly connect the float assemblies to carry a mounting platform 35 and a deck 37 thereon. To permit the bolts 28 and 32 to be drawn tight, reinforcements can be placed, as shown, within the channels of the beams 26, 27, 30 and 31. To allow the float tubes to remain in shape, a cylinder, not shown, can be disposed coaxially around the bolts and diametrically within the tubes.

A mounting platform 35 from which the generator 11 is suspended rides upon and is bolted to the I beams 30 and 31. The platform 35 can be of any rigid material, such as steel or the like, and, if desired, can include a plurality of braces 38, 39, and 40 welded along its top surface for reinforcement. A hollow tube 47 portion of the generator 11 extends through a hole 42 centrally located within the platform 35. Fuel, exhaust, and control lines (not shown) can be conducted through the tube 47 from appropriate sources (not shown) on the float or elsewhere to the generator 11 below the water. A collar 43 surrounding the hole 42 and attached to the platform 35 adds further reinforcement and rigidity to the platform 35.

The generator 11 can be conveniently suspended from the platform 35 in several ways. As illustrated, a plurality of outwardly extending arms 60–63, attached to the tube 47 which carries the generator 11, connect to a shock absorbing means, such as the shock absorbing rubber bellows 50–53, illustrated. The bellows 50–53, can be, for example, rubber bellows of the type often used for air cushions for truck trailers and the like, and, additionally, if desired, can include a valve or other air control means (not shown) to permit air flow to be controlled into and/or out of the bellows. To facilitae attachment of the arms 60–63, the top and bottom of the bellows 50–53 present metal plates to which connection can be made by welding or the like, the bottom plate being fastened to the platform 35 and the top plate to the tube 47.

An alternative way for mounting the generator 11 is shown in FIG. 2, in which the frame 70, of similar construction to the platform 35 of FIG. 1, includes a plurality of radially outwardly extending brace members 71 welded to the surface of the frame 70. Like platform 35, a centrally located hole (not shown) extends through it and a ring or collar 72 reinforces it. A mounting ring 73 attached to the collar 72 bears the weight of the suspended generator 11. A foam rubber or other cushion 76 rides on the mounting plate 73, which, in turn, carries a ring or other outward extension 78 from the tube 47. Thus, the entire weight of the generator 11 is carried upon the mounting ring 73 and cushion 76 by the extension 78 attached to the tube 47.

As shown in FIG. 1, a deck 37 extends over substantially the entire area above and between the floats 12 and 13. The deck can be of any material, reinforced continuous strand fiberglass within a plastic binder of self-extinguishing polyester, and having a nonskid surface, being particularly suitable.

The generator 11 extending a considerable distance beneath the surface of the water may impede towing of the apparatus 10 by its pendulum effect. The suspending chains 66 and 67, fastened between a forward and aft location, respectively, and the generator 11 reduce this effect. Also, the mounting frame 35 mounted slightly aft from the center of gravity of the entire float mass causes the bow of the float to ride slightly higher out of the water than the stern, to further minimize such pendulum effect.

In operation, the float 10 is towed in the water to the location at which generator 11 is to be fired. The fuel, air and other firing constituents are conducted through the conducting lines in tube 47 to within the firing chamber of the generator 11, from bottles or the like (not shown), which can be conveniently located on the deck of the float. The generator 11 is then fired by igniting the charge by an ignition system which also can be located on the float, or on the towing boat, as may be convenient. In the embodiment of FIG. 1, the upward movement of the tube 47 is constrained by the bellows 50–53, and in the embodiment of FIG. 2, there is no constraint to upward movement of the tube 47, and the shocks are thereby effectively isolated from the float.

The entire float 10 is then towed to the next location at which the seismic energy is to be generated, and the process repeated.

Although the invention has been described and illustrated with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. Apparatus for carrying a seismic energy generator upon a water surface, comprising:
   a pair of floats side by side;
   forward and aft braces interconnected between said floats;
   a platform, with a centrally located hole therethrough, carried upon said braces;

means for suspending the seismic energy generator below said floats beneath the water surface;

a hollow tube connected to the seismic energy generator and extending above the water surface through the hole in said platform, for conducting fuel, control, and exhaust lines to the seismic energy generator.

2. The apparatus of claim 1 wherein said floats are of filament wound fiberglass.

3. The apparatus of claim 2 wherein each of said floats comprises two elongated enclosed tubes, and an enclosing layer surrounding said tubes lengthwise to present an essentially smooth continuous surface about said tubes.

4. The apparatus of claim 3 wherein the seismic energy generator is carried aft of the center of gravity of said floats, braces, and platform.

5. The apparatus of claim 4 wherein said two tubes are tapered inwardly and upwardly at their forward ends to facilitate towing.

6. The apparatus of claim 1 wherein said means for suspending comprises means attached to said tube for engaging said platform.

7. The apparatus of claim 6 wherein said engaging means comprises shock absorbing means mounted between said platform and said tube.

8. The apparatus of claim 7 wherein said shock absorbing means are four in number.

9. The apparatus of claim 8 wherein each of said shock absorbing means is a bellows.

10. The apparatus of claim 9 further comprising four outwardly extending arm members each connected between said tube and a respective one of said bellows.

11. The apparatus of claim 9 wherein said bellows is made of rubber.

* * * * *